(12) United States Patent
Killion et al.

(10) Patent No.: US 7,890,276 B2
(45) Date of Patent: *Feb. 15, 2011

(54) PRESSURE RELIEF VALVE MONITORING

(75) Inventors: Lane Thomas Killion, Gardnerville, NV (US); John Wesley Grant, Gardnerville, NV (US); William Charles Jost, Minden, NV (US); Michael Lee Whaley, Jr., Bozeman, MT (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/707,375

(22) Filed: Feb. 17, 2010

(65) Prior Publication Data

US 2010/0154515 A1 Jun. 24, 2010

Related U.S. Application Data

(63) Continuation of application No. 12/257,870, filed on Oct. 24, 2008, now Pat. No. 7,711,500.

(51) Int. Cl.
*G06F 19/00* (2006.01)
(52) U.S. Cl. .......................................... 702/50; 702/51
(58) Field of Classification Search .................... 702/50, 702/51, 54, 130, 188; 73/152.19, 152.55; 169/20

See application file for complete search history.

(56) References Cited

U.S. PATENT DOCUMENTS

| | | | |
|---|---|---|---|
| 4,502,322 A | 3/1985 | Tero | |
| 4,843,884 A | 7/1989 | House et al. | |
| 5,363,874 A * | 11/1994 | Henszey et al. | ............... 137/14 |
| 2004/0225458 A1 | 11/2004 | Sherikar | |
| 2005/0016770 A1 | 1/2005 | Mayes | |
| 2007/0154325 A1 | 7/2007 | Grant et al. | |
| 2008/0183863 A1 | 7/2008 | Hess et al. | |

FOREIGN PATENT DOCUMENTS

GB 2146122 A 4/1985

(Continued)

OTHER PUBLICATIONS

European Patent Application No. 09173328.7.1236, European Search Report, dated Feb. 3, 2010.

(Continued)

*Primary Examiner*—Bryan Bui
(74) *Attorney, Agent, or Firm*—Hoffman Warnick LLC; Ernest G. Cusick

(57) ABSTRACT

A pressure relief valve monitoring system and method is disclosed. In one aspect there is an online pressure relief valve monitoring system that includes at least one acoustic sensor located about a pressure relief valve that obtains ultrasonic measurements therefrom. One or more temperature sensors located about the pressure relief valve obtain temperature measurements therefrom. A data acquisition system receives the ultrasonic measurements from the at least one acoustic sensor and the temperature measurements from the one or more temperature sensors. An online monitor monitors the measurements received by the data acquisition system for detection of a leak about the pressure relief valve. The online monitor detects the presence of the leak as a function of the ultrasonic measurements and temperature measurements.

20 Claims, 2 Drawing Sheets

FOREIGN PATENT DOCUMENTS

| | | | |
|---|---|---|---|
| GB | 2376072 A | 4/2002 | |
| JP | 01109235 | 4/1989 | |

OTHER PUBLICATIONS

Unknown, "Trendmaster Goes Pro", 2Q04 Orbit, Product Update, pp. 30-47.

GE Energy, "System 1 Optimization and Diagnostic Platform", Revised May 2005, 12 Pages.

GE Energy, "Condition Monitoring Solutions for Balance-of-Plant-Assets," Product Overview, Revised Feb. 2005, pp. 1-8.

GE Energy, "Bently Nevada* Trendmaster* Pro Condition Monitoring and Diagnostics", System 1 Optimization and Diagnostic Platform, 2005, 8 pages.

GE, "149744 Trendmaster Dynamic Scanning Module", Bentley Nevada Asset Condition Monitoring, Copyright 2002, Revised 2008, Specifications and Ordering Information, Part No. 149831-01, pp. 1-13.

GE, "System 1 Version 6.x Optimization and Diagnostics Software", Copyright 2006, Revised 2008, Specifications and Ordering Information, Part No. 174590-01, pp. 1-13.

Killion et al., U.S. Appl. No. 12/257,870, filed Oct. 24, 2008, Office Action dated Aug. 31, 2009, 9 pages.

Killion et al., U.S. Appl. No. 12/257,870, filed Oct. 24, 2008, Notice of Allowance and Fee(s) Due dated Jan. 28, 2010, 6 pages.

\* cited by examiner

PRESSURE RELIEF VALVE MONITORING

CROSS-REFERENCE TO RELATED APPLICATIONS

This application is a continuation application of currently pending U.S. patent application Ser. No. 12/257,870, filed on Oct. 24, 2008. The application identified above is incorporated herein by reference in its entirety for all that it contains in order to provide continuity of disclosure.

BACKGROUND OF THE INVENTION

The present invention relates generally to pressure relief valve monitoring and more particularly to monitoring a pressure relief valve for the presence of leaks with a combination of leak detection sensors and an online condition monitoring system.

Pressure relief valves are used in a variety of industrial applications to regulate the flow of process materials by opening or closing various passageways. One particular industrial application where pressure relief valves are used is within oil refineries. A leak occurring at a pressure relief valve within an oil refinery can lead to explosions and safety issues, fines imposed for flare events and releases of hazardous substances to the atmosphere. Any one of these incidents can result in reactive maintenance, increased maintenance costs and consequent reduction in oil refinery production. In order to prevent these incidents from occurring, operators of the oil refinery have an interest in monitoring these pressure safety release valves and detecting leaks as soon as possible. Because a typical oil refinery will have hundreds or even thousands of pressure relief valves, the costs and time associated with monitoring these valves can be appreciable. Reducing the costs and time associated with managing these valves can have a large impact on the profitability and reputation of the oil refinery. However, current approaches in monitoring pressure relief valves have issues with respect to effectiveness and accuracy in detecting leaks. For example, many of these current approaches in monitoring pressure relief valves generate nuisance alarms (i.e., false positives) that are likely due to acoustic noise sources such as turbulence created from hose downs, steam whistles or piping vibrations (e.g., ambient plant noise) in the vicinity of the valves and not the presence of a leak.

BRIEF DESCRIPTION OF THE INVENTION

In one aspect of the present invention, an online pressure relief valve monitoring system is provided. The online pressure relief valve monitoring system comprises at least one acoustic sensor located about a pressure relief valve that obtains ultrasonic measurements therefrom. One or more temperature sensors located about the pressure relief valve obtain temperature measurements therefrom. A data acquisition system receives the ultrasonic measurements from the at least one acoustic sensor and the temperature measurements from the one or more temperature sensors. An online monitor monitors the measurements received by the data acquisition system for detection of a leak about the pressure relief valve. The online monitor detects the presence of the leak as a function of the ultrasonic measurements and temperature measurements.

In a second aspect of the present invention, there is a method for monitoring a pressure relief valve. The method comprises: obtaining ultrasonic measurements from at least one acoustic sensor located about a pressure relief valve; obtaining temperature measurements from one or more temperature sensors located about the pressure relief valve; collecting the ultrasonic measurements from the at least one acoustic sensor and the temperature measurements from the one or more temperature sensors; transferring the ultrasonic measurements and temperature measurements to a host computer; and monitoring the measurements with the host computer for detection of a leak about the pressure relief valve, the host computer detecting the presence of the leak as a function of both the ultrasonic measurements and temperature measurements.

In a third aspect of the present invention, a pressure relief valve monitoring system is provided. In this embodiment, the system comprises at least one acoustic sensor located about a pressure relief valve that obtains ultrasonic measurements therefrom. One or more temperature sensors located about the pressure relief valve obtain temperature measurements therefrom. A data acquisition system receives the ultrasonic measurements from the acoustic sensor and the temperature measurements from the one or more temperature sensors. The data acquisition system detects for the presence of a leak about the pressure relief valve. The data acquisition system detects the presence of the leak as a function of the ultrasonic measurements and temperature measurements.

DETAILED DESCRIPTION OF THE INVENTION

At least one embodiment of the present invention is described below in reference to its application in connection with and operation of monitoring a pressure relief valve within an oil refinery. However, it should be apparent to those skilled in the art and guided by the teachings herein that the present invention is likewise applicable to any industrial facility that may employ pressure relief valves. A non-exhaustive listing of possible industrial facilities that employ pressure relief valves and have a need to monitor such valves includes power generation plants, chemical facilities and electrical facilities. Those skilled in the art will further recognize that the teachings herein are suited to other applications in addition to industrial settings such as for example military, commercial and residential applications.

Figure 1:
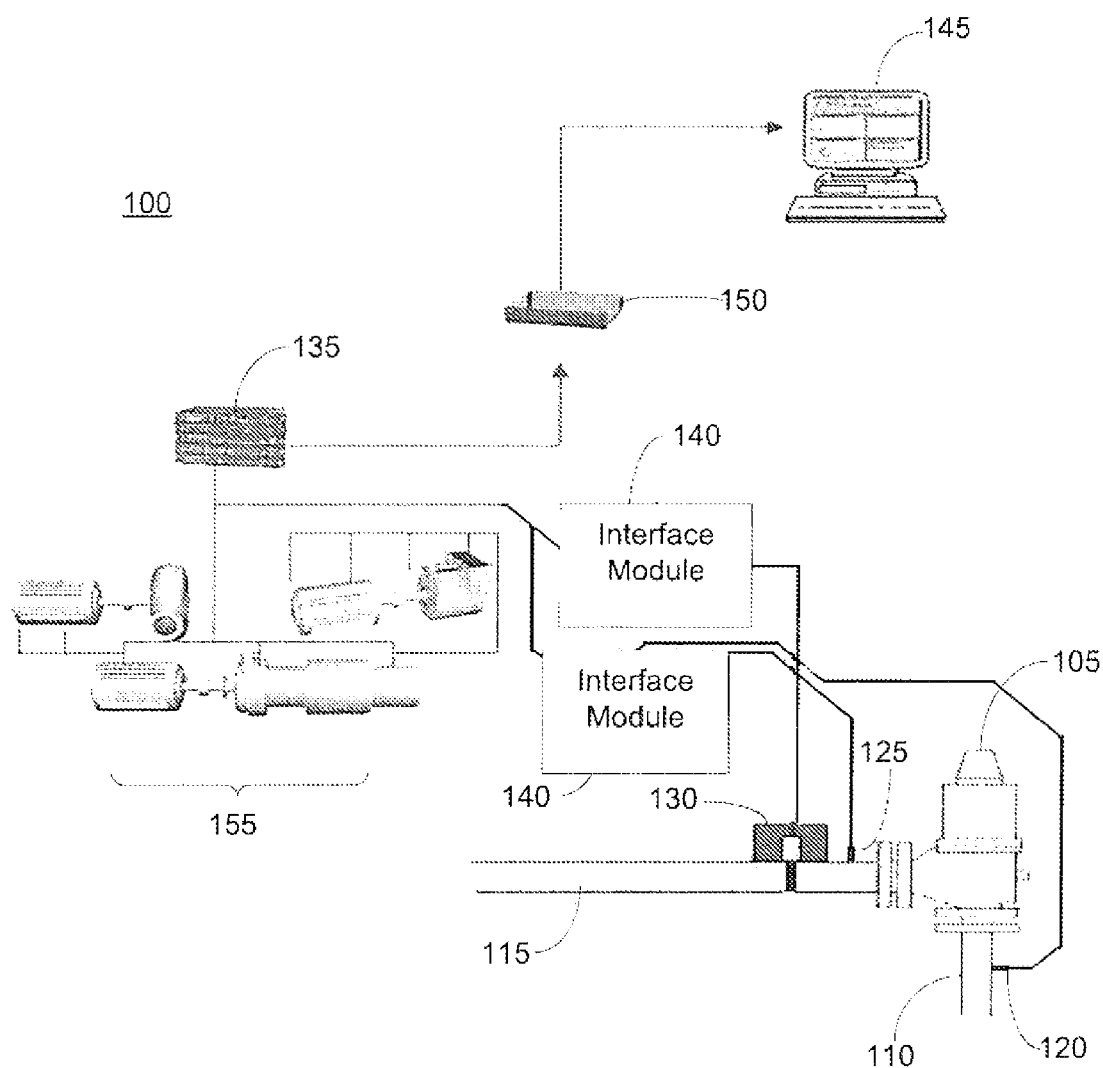
FIG. 1 is a schematic illustration of an online pressure relief valve monitoring system according to one embodiment of the present invention.

Referring to the drawings, FIG. 1 is a schematic illustration of an online pressure relief valve monitoring system 100 according to one embodiment of the present invention. The pressure relief valve monitoring system 100 includes a pressure relief valve 105 that is used to regulate the flow of process material that may include various gases and liquids in an oil refinery. Those skilled in the art will recognize that a typical oil refinery will have hundreds and possibly thousands of pressure relief valves in use. For ease of illustrating the features of the present invention, FIG. 1 shows only one pressure relief valve. As shown in FIG. 1, a pipe 110 leads into an inlet end of a pressure relief valve. Pressure relief valve 105 and a pipe 115 extend from an exit end of pressure relief valve 105. One or more temperature sensors are located about pressure relief valve 105 to obtain temperature measurements therefrom. In one embodiment, as shown in FIG. 1, there is a first temperature sensor 120 and a second temperature sensor 125. Temperature sensor 120 is located on pipe 110 at the inlet end of pressure relief valve 105 and temperature sensor 125 is located on pipe 115 at the exit end of the pressure relief valve 105. Although not shown in FIG. 1, the oil refinery would have a variety of other temperature sensors located throughout to obtain other temperature measurements. For example, there would be temperature sensors to monitor ambient temperature conditions about the refinery including the pressure relief valves. In addition to these temperature sensors, FIG. 1 shows that there is an acoustic sensor 130 located about pressure relief valve 105 that obtains ultrasonic measurements therefrom. As shown in FIG. 1, acoustic sensor 130 is located on pipe 115 at the exit end of pressure relief valve 105. Those skilled in the art will recognize that the location of these sensors can vary with respect to their location on or adjacent pressure relief valve 105 and are not limited to any one particular location. In addition, those skilled in the art will recognize that the number of sensors used to detect a leak can be more than what is illustrated and described herein.

A data acquisition system 135 receives temperature measurements from temperature sensors 120 and 125 and the ultrasonic measurements from acoustic sensor 130. As shown in FIG. 1, an interface module 140 couples temperature sensors 120 and 125 and acoustic sensor 130 to data acquisition system 135. The data acquisition system 135 transfers the measurements to an online monitor 145 via a communications network 150 such as a switch and hub. Data acquisition system 135 monitors the measurements for detection of a leak about pressure relief valve 105. As explained below, online monitor 145 detects the presence of the leak as a function of both the ultrasonic measurements and temperature measurements.

In addition to monitoring the condition of pressure relief valve 105, data acquisition system 135 and online monitor 145 are configured to monitor other essential assets 155 besides pressure relief valves that are used throughout the oil refinery. Because the scope of the present invention is directed to monitoring pressure relief valve 105 for leaks, details associated with monitoring other essential assets 155 associated with the oil refinery are not discussed herein.

In one embodiment, first temperature sensor 120 and second temperature sensor 125 comprise a thermocouple such as a K-type thermocouple that couples to piping 110 and 115, respectively. Those skilled in the art will recognize that other temperature sensors are suitable for use in this application as long as such temperature sensors can withstand a wide range of temperatures (e.g., about −40 F. degrees to about 400 F. degrees).

In one embodiment, acoustic sensor 130 comprises an ultrasonic acoustic sensor. Those skilled in the art will recognize that other types of acoustic sensors are suitable for use in this application as long as such acoustic sensors can detect the presence of ultrasonic sound waves that results from turbulent flow.

In one embodiment, data acquisition system 135 is a dynamic scanning module that collects sensor data and performs signal processing operations on the collected data. One example of such a dynamic scanning module is the GE TRENDMASTER™ Pro System. In such a dynamic scanning module, there are multiple input cards that are configured to accept multiple sensor bus cables. The sensors on each bus are polled sequentially every few minutes, allowing the dynamic scanning module to collect condition monitoring data from many different connected points. The input card of this type of dynamic scanning module is configured to receive the multiple sensor readings via the interface module 140 coupled to each particular sensor. In addition, this dynamic scanning module is configured to communicate the collected and processed measurements to online monitor 145 via the communication network 150 by a conventional wired connection or a wireless Ethernet connection.

In one embodiment, online monitor 145 is a host computer that is online with data acquisition system 135, temperature sensors 120 and 125 and acoustic sensor 130. The host computer contains software algorithms, a plurality of rules and databases that allow an operator of the oil refinery to perform timely data validation, calculations and analysis and timely detection of specific events and malfunctions including the detection of leaks in the pressure relief valve. GE SYSTEM1 software is one type of software package that could be used in conjunction with the host computer.

Figure 2:
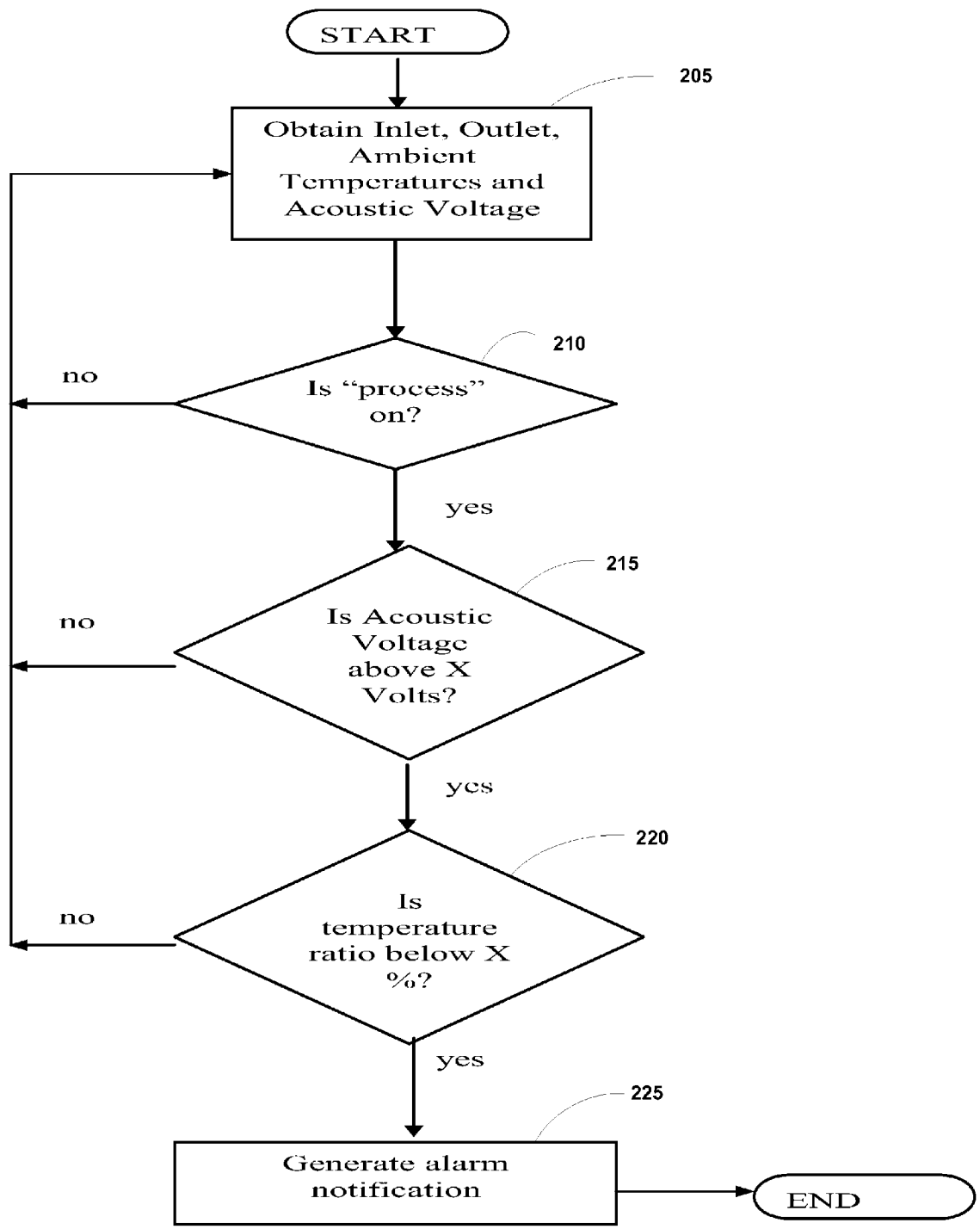
FIG. 2 is a flow chart describing the process operations associated with using the online pressure relief valve monitoring system of FIG. 1 to detect the presence of a leak according to one embodiment of the present invention.

FIG. 2 is a flow chart 200 describing the process operations associated with using pressure relief valve monitoring system 100 to detect the presence of a leak according to one embodiment of the present invention. The process operations of detecting the presence of a leak at a pressure relief valve begin at 205 by obtaining temperature measurements and ultrasonic measurements from temperature sensors 120 and 125 and acoustic sensor 130, respectively. This operation involves data acquisition system 135 periodically receiving these measurements from the sensors via interface module 140 and transferring this data to online monitor 145 via communications network 150. In addition to obtaining temperature measurements at the inlet end and outlet end of the pressure relief valve, the data acquisition system is receiving ambient temperature measurements from about the pressure relief valve using other temperature sensors. This includes placing a temperature sensor outdoors to monitor and trend ambient temperatures of the environment the assets in the refinery are subjected to. Alternatively, one could simply use the refinery's ambient temperature measurements from their distributed control system to obtain these ambient temperature measurements. All of these measurements from the acoustic sensor and temperature sensors are transferred from the data acquisition system to the online monitor.

Online monitor 145 uses these measurements sent from the data acquisition system to determine if the leak detection process is "on" at 210. In particular, online monitor 145 determines that the leak detection process is on when the difference between the inlet and outlet temperatures at the pressure relief valve is greater than or equal to a predetermined temperature threshold (e.g., 50%). If online monitor 145 does not determine that the leak detection process is on then the process flow loops back to process block 205 where the sensors continue to obtain measurements. Otherwise, online monitor 145 continues with the leak detection process.

Once it has been determined that the process is on, online monitor 145 uses a plurality of leak detection rules to determine if the valve is leaking. The rule logic associated with the plurality of leak detection rules monitor at 215 whether a voltage associated with the ultrasonic measurements generated from the acoustic sensor exceed a predetermined voltage threshold (e.g., 5 Volts). The instance the predetermined voltage threshold is exceeded, the rule logic associated with the plurality of leak detection rules starts monitoring to see if a predetermined temperature ratio threshold has been met at 220. In particular, if the ratio of the inlet, outlet and ambient temperatures reaches a configured threshold value, then online monitor 145 will generate an alarm notification at 225. In one embodiment, the temperature ratio is defined as the absolute value of the difference between the inlet and outlet temperatures divided by the absolute value of the difference between the inlet and ambient temperatures multiplied by 100. An example of a temperature ratio threshold is when the inlet to outlet temperature difference is 50% or less of the inlet to ambient temperature difference. With this type of temperature ratio threshold, only a significant variation in temperature between the inlet, outlet and ambient temperature will result in an alarm notification. This prevents false alarming from the acoustic sensor. As used herein, a significant variation would include a temperature ratio threshold that is 50% or greater. This generally means that the pressure relief valve is passing fluid from the inlet to the outlet.

If it is determined that there is not a significant temperature variation as determined at process block 215 and 220, then the monitoring and obtaining of sensor measurements continues back at process block 205 where process blocks 205-220 are repeated until it is determined at process block 220 that it is necessary to generate an alarm. As a result, the online monitor will generate an alarm notification at 225 indicating the presence of the leak about pressure relief valve. Those skilled in the art will recognize that there are a multitude of approaches to generating an alarm. A non-exhaustive listing of alarm notifications includes generating emails, visual and/or audible alarms to operators of the oil refinery.

The foregoing flow chart shows some of the processing functions associated with detecting the presence of a leak about a pressure relief valve. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added. For example, in one embodiment, online monitor 145 is configured to generate an analysis of the leak in response to determining the presence of the leak about the pressure relief valve. This analysis comprises determining an approximation of the amount of the leak, the time when the leak occurred and the duration of the leak. Online monitor 145 is able to perform this analysis by calculating the volume based on valve capacity as a function of the duration that the valve was leaking.

Those skilled in the art will recognize that it is possible to implement some of the functionality of online monitor 145 in data acquisition system 135 such that data acquisition system 135 is able to detect for the presence of the leak without having to make this determination from the host computer environment. In this embodiment, data acquisition system 135 would compare inlet temperature at piping 110 that leads into pressure relief valve 105 with outlet temperature at piping 115 that extends from pressure relief valve 105. Then using the plurality of leak detection rules, the data acquisition system 135 would determine if there is a leak using the same operations described for FIG. 2.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. An online pressure relief valve monitoring system, comprising:
   at least one acoustic sensor located about a pressure relief valve that obtains ultrasonic measurements therefrom;
   one or more temperature sensors located about the pressure relief valve that obtain temperature measurements therefrom;
   a data acquisition system that receives the ultrasonic measurements from the at least one acoustic sensor and the temperature measurements from the one or more temperature sensors; and
   an online monitor that monitors the measurements received by the data acquisition system for detection of a leak about the pressure relief valve, the online monitor detecting the presence of the leak as a function of the ultrasonic measurements and temperature measurements.

2. The online pressure relief valve monitoring system according to claim 1, wherein the one or more temperature sensors comprise a first temperature sensor and a second temperature sensor, the first temperature sensor located on a first pipe that leads into an inlet end of the pressure relief valve and the second temperature sensor located on a second pipe that extends from an exit end of the pressure relief valve.

3. The online pressure relief valve monitoring system according to claim 2, wherein the at least one acoustic sensor is located on the second pipe that extends from the exit end of the pressure relief valve.

4. The online pressure relief valve monitoring system according to claim 3, wherein the online monitor determines if there has been a change in temperature between the temperature at the inlet end of the pressure relief valve as measured by the first temperature sensor and the temperature at the exit end of the pressure relief valve as measured by the second temperature sensor, the online monitor compares the change in temperature to ambient temperature and ascertains whether the change in temperature varies with the ambient temperature, the online monitor detects the presence of the leak in response to determining that the change in temperature varies with the ambient temperature.

5. The online pressure relief valve monitoring system according to claim 4, wherein the online monitor detects the presence of the leak in response to further determining that the ultrasonic measurements exceed a predetermined threshold value.

6. The online pressure relief valve monitoring system according to claim 1, wherein the data acquisition system transfers the ultrasonic measurements and the temperature measurements to the online monitor through a wired connection or a wireless connection.

7. The online pressure relief valve monitoring system according to claim 1, wherein the online monitor utilizes a plurality of rules to detect the presence of the leak, the plurality of rules detect the presence of the leak in response to ascertaining that there has been a change in temperature that varies with ambient conditions.

8. The online pressure relief valve monitoring system according to claim 7, wherein the online monitor detects the presence of the leak in response to further determining that the ultrasonic measurements exceed a predetermined threshold value.

9. The online pressure relief valve monitoring system according to claim 1, wherein the online monitor generates an alarm notification in response to determining the presence of the leak about the pressure relief valve.

10. The online pressure relief valve monitoring system according to claim 1, wherein the online monitor generates an analysis of the leak in response to determining the presence of the leak about the pressure relief valve, the analysis comprising an approximation of the amount of process material leaked as a function of the time when the leak occurred, the duration of the leak and the size of the valve.

11. A method for monitoring a pressure relief valve, comprising:
  obtaining ultrasonic measurements from at least one acoustic sensor located about a pressure relief valve;
  obtaining temperature measurements from one or more temperature sensors located about the pressure relief valve;
  collecting the ultrasonic measurements from the at least one acoustic sensor and the temperature measurements from the one or more temperature sensors;
  transferring the ultrasonic measurements and temperature measurements to a host computer; and
  monitoring the measurements with the host computer for detection of a leak about the pressure relief valve, the host computer detecting the presence of the leak as a function of both the ultrasonic measurements and temperature measurements.

12. The method according to claim 11, further comprising placing a first temperature sensor on a first pipe that leads into an inlet end of the pressure relief valve and placing a second temperature sensor on a second pipe that extends from an exit end of the pressure relief valve.

13. The method according to claim 12, further comprising placing the at least one acoustic sensor on a location on the second pipe that extends from the exit end of the pressure relief valve.

14. The method according to claim 13, wherein the monitoring comprises determining if there has been a change in temperature between the temperature about the inlet end of the pressure relief valve as measured by the first temperature sensor and the temperature about the exit end of the pressure relief valve as measured by the second temperature sensor, comparing the change in temperature to ambient conditions, and ascertaining whether the change in temperature varies with the ambient conditions.

15. The method according to claim 14, wherein the ascertaining comprises determining if the ultrasonic measurements exceed a predetermined threshold value.

16. The method according to claim 15, further comprising generating an alarm notification in response to determining that the change in temperature varies with the ambient conditions and that the ultrasonic measurements exceed a predetermined threshold value.

17. A pressure relief valve monitoring system, comprising:
  at least one acoustic sensor located about a pressure relief valve that obtains ultrasonic measurements therefrom;
  one or more temperature sensors located about the pressure relief valve that each obtain temperature measurements therefrom; and
  a data acquisition system that receives the ultrasonic measurements from the acoustic sensor and the temperature measurements from the one or more temperature sensors, the data acquisition system detecting for the presence of a leak about the pressure relief valve, the data acquisition system detecting the presence of the leak as a function of the ultrasonic measurements and temperature measurements.

18. The pressure relief valve monitoring system according to claim 17, wherein the one or more temperature sensors comprise a first temperature sensor and a second temperature sensor, the first temperature sensor located on a first pipe that leads into an inlet end of the pressure relief valve and the second temperature sensor located on a second pipe that extends from an exit end of the pressure relief valve.

19. The pressure relief valve monitoring system according to claim 18, wherein the at least one acoustic sensor is located on the second pipe that extends from the exit end of the pressure relief valve.

20. The pressure relief valve monitoring system according to claim 19, wherein the data acquisition system determines if there has been a change in temperature between the temperature at the inlet end of the pressure relief valve as measured by the first temperature sensor and the temperature at the exit end of the pressure relief valve as measured by the second temperature sensor, the data acquisition system compares the change in temperature to ambient conditions and ascertains whether the change in temperature varies with the ambient conditions, the data acquisition system detects the presence of the leak in response to determining that the change in temperature varies with the ambient conditions.

* * * * *